United States Patent Office 3,400,617
Patented Sept. 10, 1968

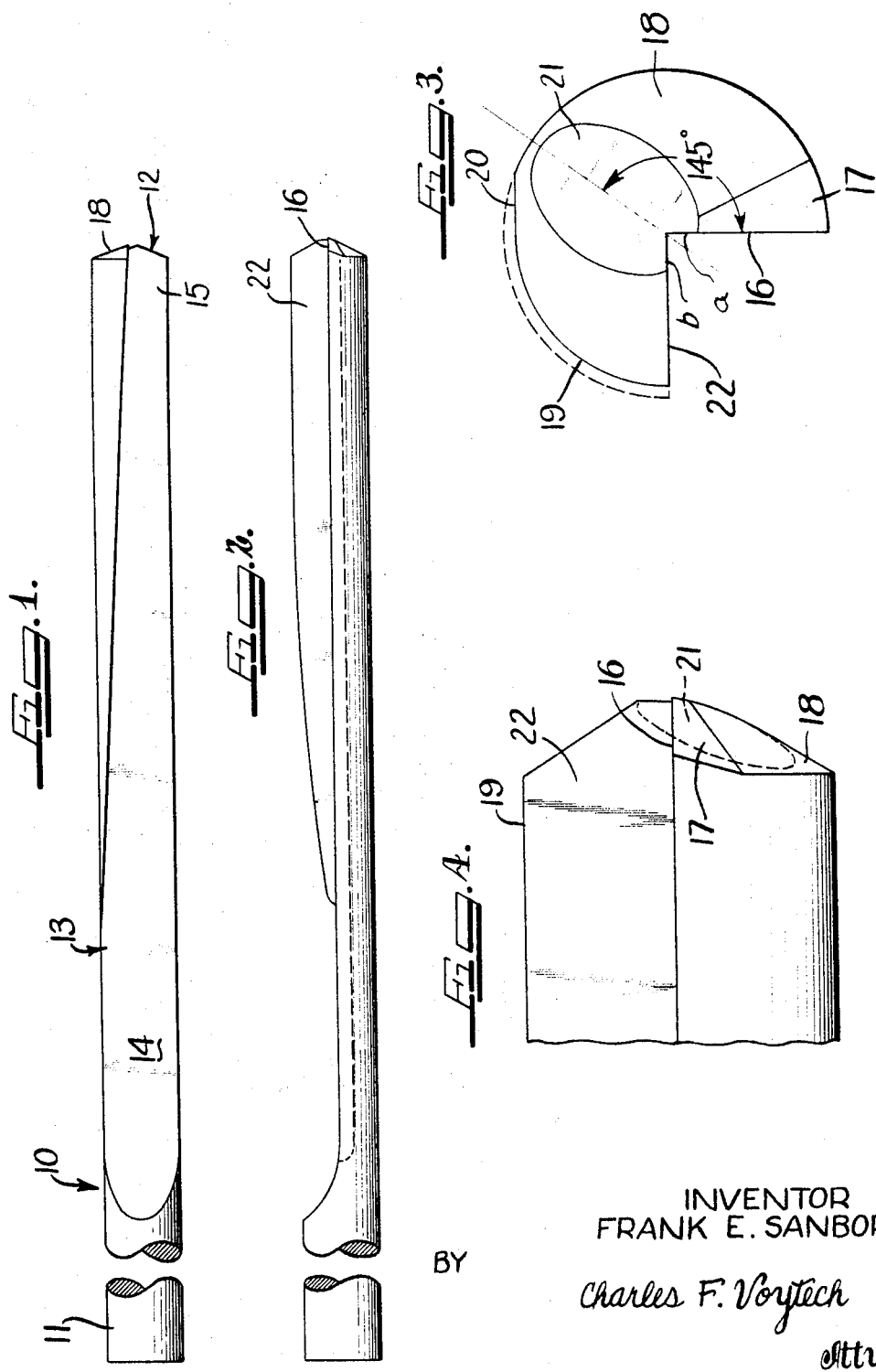

3,400,617
DRILL BIT TIP
Frank E. Sanborn, 626 Busse Highway,
Park Ridge, Ill. 60068
Filed July 18, 1966, Ser. No. 565,952
6 Claims. (Cl. 77—67)

This invention relates to drill bits and particularly to an improvement in the cutting end thereof.

For purposes of illustration, this invention will be described with reference to its application to a deep hole drill bit disclosed in my Patent No. 3,260,139.

The cutting end of the average drill bit, whether of the twist or straight flute type, is ground with a double conical tip in a manner to leave a chisel edge at the center, on the theory that since the center of the tip moves with a relatively low linear velocity over the metal to be cut, a cutting edge effective in a downward direction will be forced into the metal and will scrape it away. Such chisel edge, however, is weak and readily broken. Furthermore, it does not provide an efficient cutting edge for the central region of the drill bit.

An object of this invention is to provide a tip for a drill wherein the tip is formed to produce an efficient cutting edge extending from the center of the bit to the side of the bit.

A more specific object of this invention is to provide a cutting edge for a drill bit which has a predetermined clearance designed for maximum efficiency for the material being drilled.

Another specific object of this invention is the provision, in a straight-fluted drill bit, of a tip which has a cutting edge that is effective across the entire radius of the bit, for a much longer time than is normally the case.

These and other objects of this invention will become apparent from the following detailed description of a preferred embodiment thereof when taken together with the accompanying drawings in which FIG. 1 is a plan view on an enlarged scale of a deep hole drill bit to the tip of which this invention has been applied;

FIG. 2 is a side elevation of the drill bit of FIG. 1;

FIG. 3 is a greatly enlarged end elevational view of the drill bit of FIG. 1; and FIG. 4 is a side elevational view of the tip region of the drill of FIG. 1, taken in the direction of the arrows 4—4 in FIG. 3.

Referring now to the drawings for a detailed description of this invention, the drill bit illustrated is a long, round rod 10, having a shank 11, a generally conical cutting end 12 and an intermediate portion 13. Said intermediate portion is cut away to produce a half-round section formed by a flat surface 14 which extends to the right, as viewed in FIG. 1, at an angle to the axis of the drill to terminate in a quarter round flute 15 having a surface 22 at right angle to surface 14.

A generally radially extending cutting edge 16 is formed by the intersection of flat surface 14 with conical cutting end 12. To provide proper clearance between cutting edge 16 and the bottom of the hole being drilled, cutting end 12 from edge 16 back approximately 10° is formed with a flat surface 17 which is disposed at an angle to the axis of the drill bit in a manner to produce an undercut or clearance with respect to edge 16. Said flat surface is formed by holding conical cutting end 12 against the flat side of a grinding wheel. The remainder 18 of cutting end 12 may be conical, with its axis coinciding with the axis of the drill and the cone angle being determined by the intersection of said clearance or undercut with said cone. Thus, after the flat surface 17 is formed, the drill is rotated about its axis while it is held against the flat surface of the grinding wheel. Surface 17 is then tangent to the conical end 18 of the bit. In one typical example, the angle between cutting edge 16 and the axis of the drill was 70° and the angle of the remainder 18 of the end 12 relative to said axis was 60°.

The drill is provided with side clearance by reducing the radial dimension of that portion 19 of the bit which is more than 180° away from flat surface 14. The two portions are connected by a surface 20. Since the full radius extends around that portion of the drill which takes the side thrust produced on the drill by the cutting edge 16, the drill will be properly guided to avoid wander despite the side clearance.

Although cutting edge clearance provided by surface 17 can extend to the center of the drill, surface 17 is tapered so that near the axis of the drill it is quite thin in an axial direction and correspondingly weak and readily worn. A much stronger cutting edge is provided at the central region of the end 12, in accordance with this invention, by grinding a substantially flat surface 21 on cone 18 in a plane which intersects the axis of the drill as well as the cutting edge 16. The location of the surface 21 on end 12 is such as to provide the desired clearance for the cutting edge 16 while at the same time removing enough metal in the adjacent central regions to avoid contact of such regions with the bottom of the hole being drilled. Accordingly, in its preferred form, surface 21 may be ground symmetrically about an element of cone 18 which is 145° from flat surface 14 and 125° from surface 22. Surface 21 is furthermore inclined relative to the axis of the drill at a greater angle than the angle of the elements of cone 18, or at approximately 80° to the axis of said drill.

The purpose of locating surface 21 closer to surface 22 than to surface 14 is to lower the other edge b of the flute relative to the cutting edge a. The grinding of surface 21 across the center of the drill removes the central portion of the clearance provided by surface 17 as well, and if surface 21 were to be ground equidistantly from the flute, the cutting edge would be at exactly the same height as the intersected part b of edge 22. This, of course, would interfere with the advance of the cutting edge into the material. Rotating the surface 10° from the equidistant location away from cutting edge 16 brings lower portions of inclined surface 21 to intersect flute wall 22 and higher portions of said surface 21 to intersect flute wall 15. In other words, all points on the inner regions of the cutting edge extend axially beyond points on surface 22 in the same radial plane, and cutting edge 16 can be advanced into the material.

Flat surface 21 intersects cutting edge 16 for approximately 20% of the length of said cutting edge measured from the axis of the drill. Since surface 21 in a direction normal to cutting edge 16 is quite long, a clearance is provided for the radially inner end of said cutting edge which is strong and correspondingly longer-lived.

The various angles and the location of the flat surface 21 given above are those which were used in a typical example and were found to result in a drill having the desired long-lasting cutting edge. It is understood that the specific cone angles and the location and inclination of flat surface 21 may be varied without departing from this invention, provided they are such as to produce clearance for cutting edge 16 over its entire length, with the clearance at the central region formed by a substantially flat surface of considerable area. It is understood further that this invention can be applied to other forms of drills, e.g., half-round and twist drills having various forms of flutes.

I claim:

1. A cutting tip for a drill bit, said tip being substantially conical with the axis of the cone substantially coinciding with the axis of the bit and having a flute which extends radially inwardly of the bit to at least the axis of the bit, said flute being defined by divergent, longitudinally extending surfaces, one of said surfaces terminating at the tip in a radially extending cutting edge, means providing a clearance for said cutting edge over the radially outer regions of said edge, and means providing a different clearance for said cutting edge over the radially inner regions of said edge.

2. A cutting tip for a drill bit as defined in claim 1, wherein said means providing clearance for said cutting edge over the radially outer regions of said edge comprises a substantially flat surface extending tangentially from an element of the cone of the tip to said cutting edge.

3. A cutting tip for a drill bit as defined in claim 1, wherein said means providing a different clearance for said cutting edge over the radially inner regions of said cutting edge comprises a substantially flat surface intersecting the central region of the tip and the cutting edge.

4. A cutting tip for a drill bit as defined in claim 1, wherein said divergent longitudinally extending surfaces of the flute are substantially flat and disposed at right angles to one another, and said means providing a different clearance for said cutting edge over the radially inner regions of said cutting edge comprises a substantially flat surface intersecting the central region of the tip and both surfaces of the flute, the angle of the said flat surface intersecting the central region relative to the axis of the bit being such that all points on the inner regions of the cutting edge extend axially beyond points on the said last-mentioned surface in the same radial plane.

5. A cutting tip for a drill bit as defined in claim 1, wherein the angle of an element of the conical tip with the axis of the bit is approximately 60°, the angle of the cutting edge over its radially outer region with the axis of the bit is approximately 70° and the means providing a different clearance for said cutting edge over the radially inner regions of said cutting edge comprises a flat surface which is disposed approximately 80° with the axis of the bit.

6. A cutting tip for a drill bit as defined in claim 5, said last-mentioned flat surface being symmetrical about an element of the conical tip which is angularly more distant from the said one of said divergent longitudinally extending flute surfaces than it is from the other of said flute surfaces.

References Cited

UNITED STATES PATENTS

| | | | |
|---|---|---|---|
| 1,513,350 | 10/1924 | Stolle | 77—68 |
| 2,325,535 | 7/1943 | Nordberg | 77—68 |

FRANCIS S. HUSAR, *Primary Examiner.*